United States Patent
Heikaus et al.

(10) Patent No.: US 8,053,056 B2
(45) Date of Patent: Nov. 8, 2011

(54) STRETCH FILM AND METHOD FOR PRODUCING A STRETCH FILM

(75) Inventors: Gerd Heikaus, Nuembrecht (DE); Lothar Heikaus, Nuembrecht (DE)

(73) Assignee: Illinios Tool Works Inc., Glenview, IL (US)

( * ) Notice: Subject to any disclaimer, the term of this patent is extended or adjusted under 35 U.S.C. 154(b) by 1547 days.

(21) Appl. No.: 10/203,952

(22) PCT Filed: Jan. 27, 2001

(86) PCT No.: PCT/EP01/00901
§ 371 (c)(1), (2), (4) Date: Dec. 21, 2004

(87) PCT Pub. No.: WO01/60709
PCT Pub. Date: Aug. 23, 2001

(65) Prior Publication Data
US 2005/0123721 A1  Jun. 9, 2005

(30) Foreign Application Priority Data
Feb. 18, 2000 (DE) .................. 100 07 614

(51) Int. Cl.
*B23B 3/24* (2006.01)
(52) U.S. Cl. ........................... 428/138; 156/253
(58) Field of Classification Search .................. 428/138; 156/253
See application file for complete search history.

(56) References Cited

U.S. PATENT DOCUMENTS

| 4,905,451 | A | * | 3/1990 | Jaconelli et al. ................. 53/410 |
| 5,013,595 | A |   | 5/1991 | Parry |
| 5,073,221 | A |   | 12/1991 | Waitts et al. |
| 5,284,540 | A |   | 2/1994 | Roth et al. |
| 5,679,200 | A | * | 10/1997 | Newcomb et al. .......... 156/308.2 |
| 5,935,681 | A | * | 8/1999 | Paulett ........................ 428/137 |
| 6,214,147 | B1 |   | 4/2001 | Mortellite et al. |
| 2001/0008676 | A1 | * | 7/2001 | Pelkie et al. .................. 428/136 |

FOREIGN PATENT DOCUMENTS

| DE | 4000495 A1 | 7/1991 |
| EP | 0 716 019 | 6/1996 |
| EP | 0 779 145 | 6/1997 |
| EP | 0 638 505 | 1/1998 |
| EP | 820856 A1 * | 1/1998 |
| EP | 909721 A1 * | 4/1999 |
| WO | WO 95/13965 | 5/1995 |
| WO | 9715442 A1 | 5/1997 |

* cited by examiner

*Primary Examiner* — William P Watkins, III
(74) *Attorney, Agent, or Firm* — Lowe Hauptman Ham & Berner, LLP

(57) ABSTRACT

A stretch film for the packing of goods, particularly for the packing of goods stacked on a pallet, comprises a prestretched main film (10). The main film (10) is reinforced by reinforcement strips (12) extending in the longitudinal direction. The reinforcement strips (12) are made from film strips of prestretched film which have been folded a plurality of times in the longitudinal direction. Between two adjacent reinforcement strips (12), the main film (10) can comprise two mutually staggered rows of holes (16,18). This stretch film with perforations (14) is particularly useful for the packing of food items.

22 Claims, 4 Drawing Sheets

STRETCH FILM AND METHOD FOR PRODUCING A STRETCH FILM

BACKGROUND

The invention relates to a stretch film and method for producing a stretch film.

Stretch films are produced by prestretching a film. Prestretching the film will increase the strength of the film. Further, the prestretching generates a memory effect so that the film upon further stretching will remember its previous condition, i.e. the film will contract. Stretch films are used for packing goods for shipment. Particularly, stretch films are utilized for tying together goods on a pallet or the like. For this purpose, the goods are stacked on a pallet, and a stretch film is wrapped completely around them to thus hold the goods safely on the pallet.

Due to different tensions in the film while being wrapped around the goods and due to sharp edges of the goods, such stretch films can easily tear at the edges. Because of the inherent tension in the film, this will cause the film sheet to tear off, so that the goods have to be wrapped again. For reducing the danger that the outer edges of the stretch film might tear, it is known from EP 0 728 102 to fold the two outer edges of the longitudinal film inwards. Also in such a stretch film, sharp edges or projecting edges of a carton may tear holes in the film. Because of the tension in the longitudinal direction of the film, these holes will enlarge along the whole width of the film so that a safe hold of the goods on a pallet will not be guaranteed anymore.

SUMMARY

It is an object of the invention to provide a stretch film and a method for producing a stretch film wherein the danger of tearing is reduced.

The stretch film according to the invention comprises a prestretched main film and reinforcement strips extending in the longitudinal direction of the main film. As provided by the invention, the reinforcement strips comprise film strips of prestretched film which are folded in the longitudinal direction. The main film has a plurality of reinforcement strips connected thereto in the longitudinal direction of the main film. The distances between the reinforcement strips can be selected in dependence from the number of the reinforcement strips and the width of the film. Even a tearing of the film between two reinforcement strips will thus cause merely a small hole which cannot grow until extending along the whole width of the film.

Since the reinforcement strips provided as folded film strips, the reinforcement of the main film can be determined by the number of the folds. The film strips are folded preferably twice, and particularly four times, in the longitudinal direction.

With usual film widths of 400 to 500 mm, preferably at least three mutually parallel reinforcement strips are connected to the main film. By providing at least three reinforcement strips made from film strips that have been folded at least four times in the longitudinal direction, the holding force of the stretch film can be increased at least five times. This advantageous particularly when packing heavy goods.

In a particularly preferred embodiment of the stretch film, the main film comprises perforations. The main film can be perforated before or after being connected to the reinforcement strip. Preferably, the perforations are formed after the application of the reinforcement strips because this will reduce the danger of a tearing of the stretch film during perforation. Such perforated stretch films with reinforcement strips will reliably provide for an interchange of air and thus are suited particularly for the packing of food items.

To increase the strength of the film and to guarantee a safe connection of the reinforcement strips with the main film, the main film is perforated preferably only in the regions between the reinforcement strips.

To decrease the danger that even the perforated main film might tear, it can be provided, in addition to the reinforcement strips, that the main film comprises a plurality of longitudinal rows of holes which are staggered relative to each other. Thus, a large strength of the stretch film is provided along with a good venting of the packed goods.

In the inventive method for producing the stretch film provided with the reinforcement strips, film strips are supplied which are made from a first prestretched film. Thereafter, reinforcement strips are produced by folding these film strips at least once in the longitudinal direction. Then, a second prestretched main film is supplied, and the reinforcement strips are connected to the main film in such a manner that the reinforcement strips will extend in parallel to each other in the longitudinal direction of the main film.

Producing the reinforcement strips through the folding of film strips offers the particular advantage that the main film and the film strips can consist of the same film and that a considerable increase of the strength is achieved by the folding. Using the same film is further advantageous in that the connection between the reinforcement strips and the main film can be performed in a simple manner.

Preferably, the film strips are produced by cutting a prestretched film. Thus, two identical film rolls can be used for producing the stiffened stretch film, one of the films serving as a main film while the reinforcement strips are produced from the other film.

In a preferably preferred variant of the method, the main film will be perforated. The perforation of the main film can be performed before or after connecting the main film to the reinforcement strip. Preferably, the perforation is carried out after the connection with the reinforcement strips. Because of the perforations in the main film, the stretch film of the invention is particularly useful for the packing of food items.

Preferably, only the regions of the main film between the reinforcement strips are perforated. Thus, the main film will not be weakened in the regions where the reinforcement strips are connected to the main film. On the other hand, especially in case of very small holes, it is possible and advantageous under the aspect of production technology to perforate the main film prior to the connection with the reinforcement strips.

Preferably, the perforation of the main film is performed to the effect that two respective reinforcement strips have a plurality of rows of holes arranged therebetween which extend in the longitudinal direction of the main film. These rows of holes are positioned in a mutually staggered arrangement to thus increase the strength of the stretch film. Such a perforation will improve the venting of the packed goods, particularly in case of food items. If particularly strong and tear-resistant stretch films are required, only one row of holes is provided between the reinforcement strips. A further increase of the strength of the stretch film with continued reliable venting can be achieved by providing holes only between each second pair of reinforcement strips so that the regions between the reinforcement strips are alternately perforated and non-perforated.

The perforating of the film can be performed e.g. by punching the holes. Particularly in thin films, it is possible to carry out the perforation by exposure to heat. For this purpose, use can be made e.g. of heated protrusions which have a temperature above the melting point of the film, e.g. preferably above 200° C. and particularly above 250° C. Such heated protrusions, which preferably comprise aluminum, can be arranged on a roller so that the perforating of the film is carried out during the transport of the film over that roller. Preferably, immediately after perforating the film by application of heat, a cooling by air is performed. The formation of the holes by melting the film is further of advantage in that the melting of the film will generate reinforced edges on the holes. Thus, tearing of the film on the holes is prevented.

To connect the reinforcement strips to the main film, at least one of the films can include additives. By use of such additives, the connection between the two films, i.e. the main film and the reinforcement strips, is reinforced.

Preferably, the main film and the reinforcement strips have different temperatures so that the films will adhere to each other already due to the differences in temperature and will enter a sufficiently strong connection.

Of particular advantage is the connecting of the reinforcement strips and the main film by application of heat. In this case, heat is supplied to at least one roller among a plurality of pressure rollers provided to press the reinforcement strips and the main film together. To avoid an impairment of the characteristics of the stretch film, the supplied heat must not be so high that the two films melt to each other or become welded to each other.

The films used are preferably films produced by the sheet blowing method or flat-molded films. The film material can be selected from a group comprising polyethylene, polyvinylchloride, ethylene-vinyl-acetate, ethylene-methylacetate and polyethylene.

To allow for a processing of film lengths as large as possible, the device for producing a reinforced, preferably perforated stretch film can be combined with a device for stretching the film. The device for reinforcing and perforating the film is then arranged directly downstream of the device for stretching the film. Winding up the stretched film prior to reinforcing and perforating the same is not required in this case.

BRIEF DESCRIPTION OF THE DRAWINGS

The invention will be explained in greater detail hereunder in connection with a preferred embodiment with reference to the accompanying drawings.

FIG. 3a is a schematic sectional view of a folded film strip, taken along the line I in FIG. 2a, FIG. 3b is a schematic sectional view of a folded film strip, taken along the line II in FIG. 2a, FIG. 3c is a schematic sectional view of a folded film strip, taken along the line III in FIG. 2a, and FIG. 3d is a schematic sectional view of a folded film strip, taken along the line IV in FIG. 2a.

DETAILED DESCRIPTION

Figure 1:
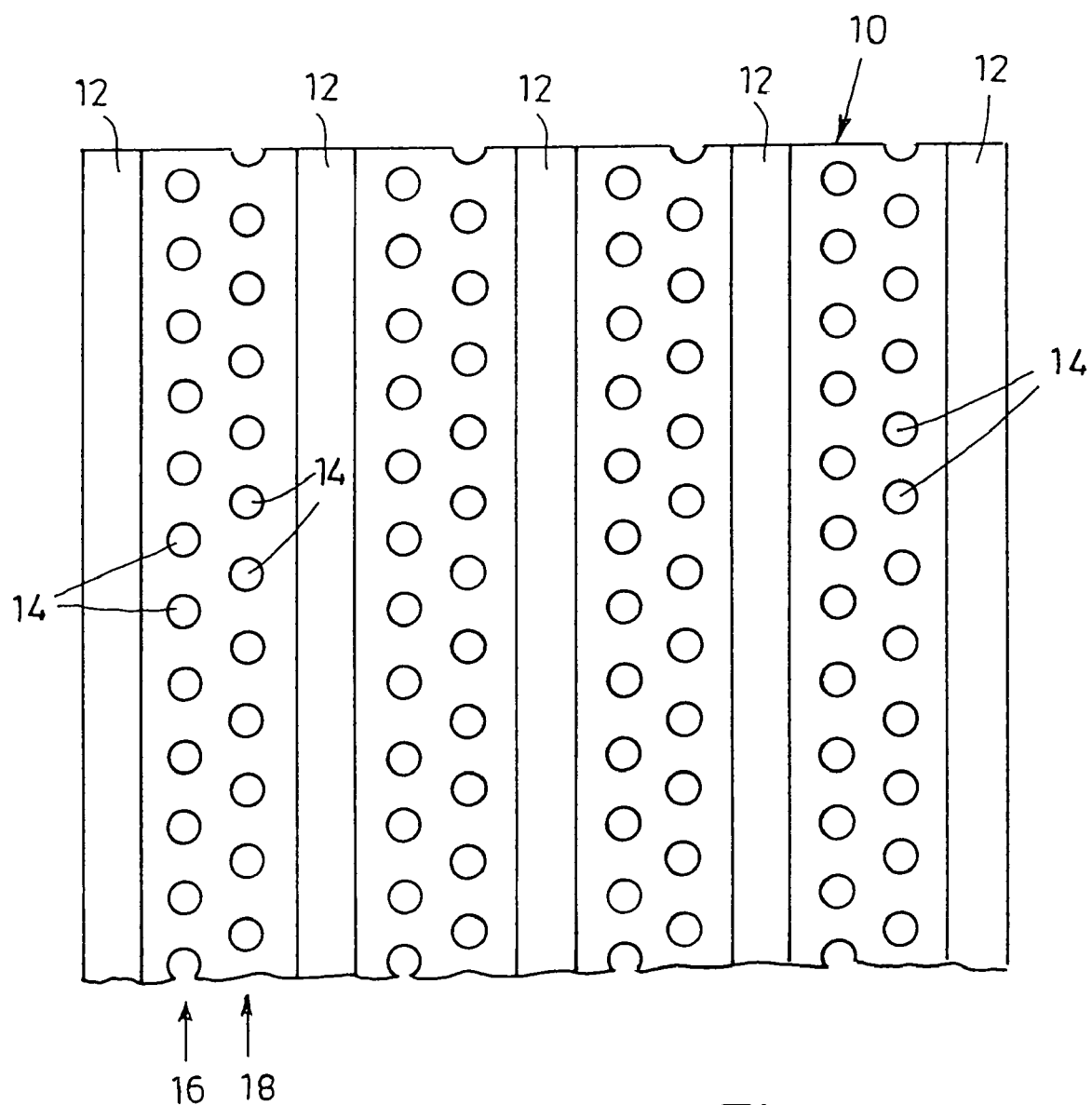
FIG. 1 is a schematic plan view of a stretch film according to the invention.
Figure 2A:
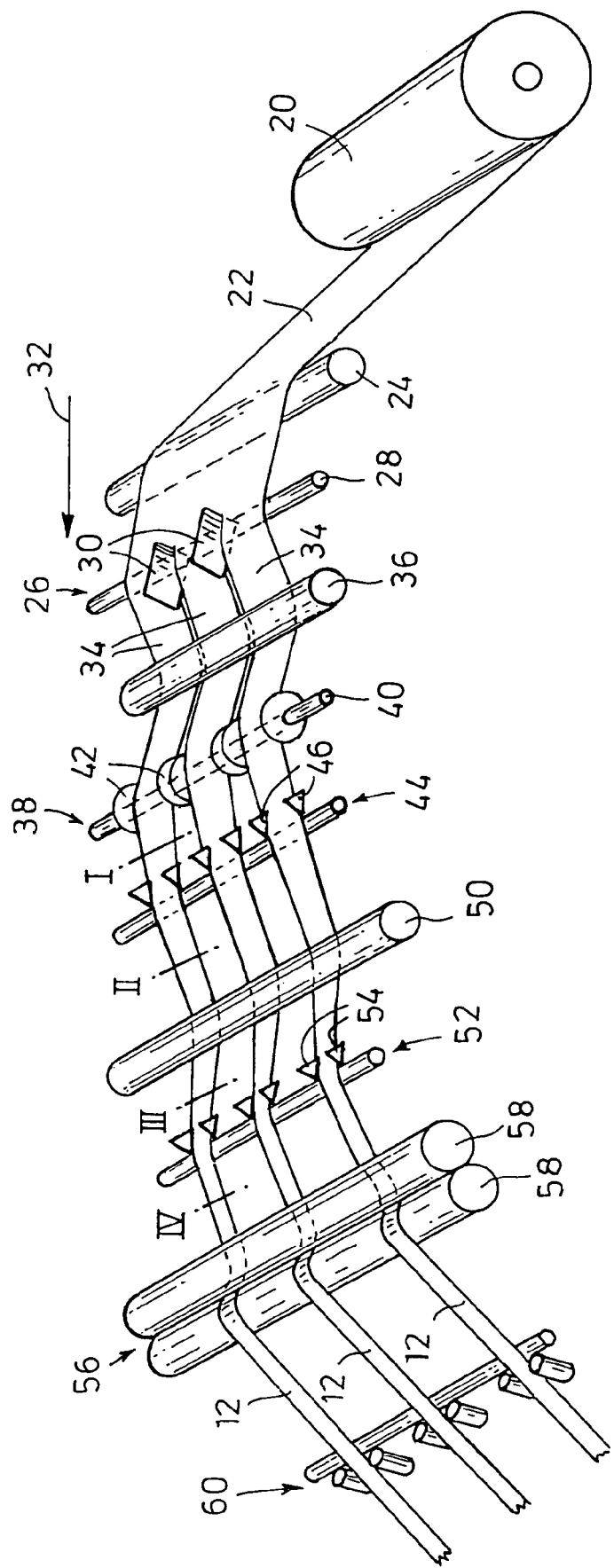
FIGS. 2a and 2b show a schematic view of a device for producing the stretch film of the invention.

The stretch film comprises a main film 10 which is provided as a prestretched film. A plurality of reinforcement strips 12 are connected to the main film 10 in the longitudinal direction thereof. The reinforcement strips 12 comprise film strips 34 (FIG. 2a) folded in the longitudinal direction and likewise made from prestretched film. Provided between respectively two adjacent reinforcement strips 12 are two rows of holes 16,18 comprising a plurality of holes 14. The holes 14 of the row of holes 16 are staggered relative to the holes 14 of the row of holes 18 by respectively half the distance between adjacent holes 14 of a row of holes 16,18. The holes 14 of the row of holes 16 are thus positioned to fill the gaps relative to the holes 14 of the row of holes 18.

The reinforcement strips 12 comprise the same material as the main film 10. To achieve a stronger reinforcement, the film for generating the reinforcement strips 12 is folded a plurality of times so that the reinforcement strips 12 comprise a plurality of layers. Preferably, prior to being cut into individual strips to be folded, the film from which the reinforcement strips 12 are produced has the same width as the main film 10. Thus, use can be made of identical films both for the main film 10 and for the production of the reinforcement strips 12.

For producing the reinforcement strips 12 (FIG. 2a), a first prestretched film sheet 22 is wound off a supply roll 20. The film sheet is supplied via a guide roller 24 to a cutting unit 26.

The cutting unit comprises cutting blades 30 arranged on a holding support 28. By the transport of the film sheet 22 in the direction of the arrow 32, the film sheet 22 is cut into individual film strips 34 by the cutting blades 30.

Figure 3A:
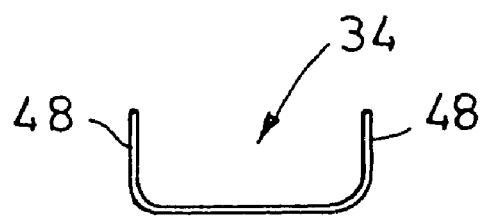

The film strips 34 are supplied, via a guide roller 36, to a curve roller 38. Curve roller 38 comprises curve elements 42 arranged for rotation on a shaft 40. By the curve elements 42 and the tension in the film strips 34, the outer longitudinal edges of the film strips 34 are folded upwards in the Figure so that each film sheet 34 is substantially U-shaped in cross section (FIG. 3a).

Figure 3B:
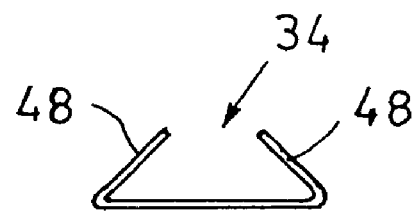

Thereafter, the film sheets 34 being U-shaped in cross section are supplied to a folding unit 44. The folding unit 44 comprises shaping rods 46. The shaping rods 46 are oriented transverse to the moving direction of the film strips and arranged at an inclination. For setting the width of the folded regions, the shaping rods can be adjusted transversely the moving direction 32 of the film strips. During the transport of the film strips 34 in the moving direction 32, the outer legs 48 (FIG. 3a) of the U-shaped film strips 34 are folded inwards. Thus, the film sheet 34 will assume the cross section shown in FIG. 3b.

Figure 3C:
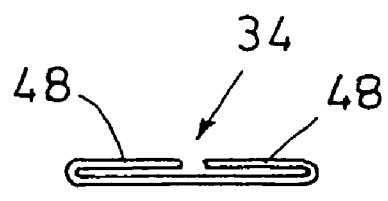

In the next step, the film strips 34 are guided around a guide roller in such a manner that the outer legs 48 of the film strips 34 point in the direction of the guide roller 50. Thereby, the outer legs 48 are pressed onto the region of film strip 34 arranged between the legs 48 (FIG. 3c).

Figure 3D:
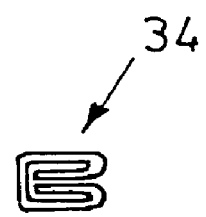

The subsequent folding unit 52, also provided with shaping rods 54, will again fold the film sheets 34 in the longitudinal direction and thus lend them the shape illustrated in FIG. 3d. Thereafter, film strip 34 is pressed together in a pressing unit, thus generating reinforcement strips 12 folded four times. The pressing unit 56 comprises two pressure rollers 58 arranged to press against each other with the required force. In this manner, trapped air will be pressed out from the reinforcement strips 12 and the individual film layers will be connected to each other.

Figure 2B:
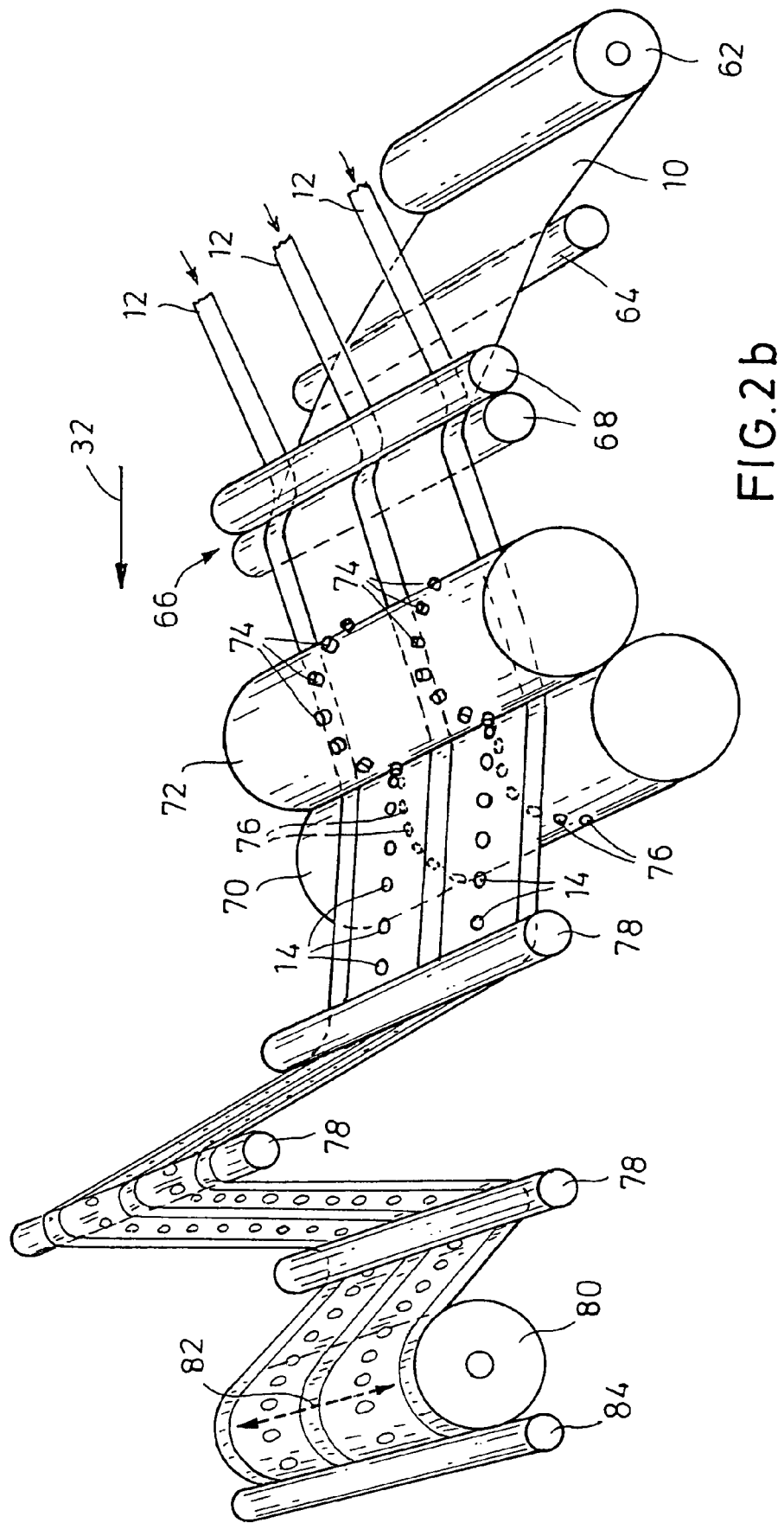

From pressing unit 56, the film strips 12 are guided via guide rollers 60 into that region of the device where the reinforcement strips 12 are to be connected to the main film 10 (FIG. 2b).

As a main film 10, a second prestretched film is wound off a supply roll 62 and guided via a guide roller 64 to a pressing unit 66. The reinforcement strips 12 are also supplied to the pressing unit 66 while moving in parallel to the longitudinal direction of main film 10 and respectively in parallel to each other. Similar to pressing unit 56, the pressing unit 66 comprises two rollers 68 arranged to press against each other with a predetermined force. The connection of the reinforcement strips 12 to the main film 10 is performed in that either the reinforcement strips 12 and/or the main film 10 includes an additive. Further, the pressing rollers 68 of the pressing units 66 can be heated so that the reinforcement strips 12 and the main film 10 will be connected to each other under the influence of heat. In this regard, care must be taken that the temperature of the pressing rollers 68 does not cause a melting of the reinforcement strips 12 or the main film 10.

In the next step, perforating rollers 70,72 will be operated to form holes into the main film 10 between the reinforcement strips 12. For this purpose, perforating roller 72 is provided with cylindrical protrusions 74 distributed about its periphery. Since the illustrated embodiment is shown as a stretch film comprising three reinforcement strips 12 and consequently two rows of holes, perforating roller 72 is provided with two rows of cylindrical protrusions 74. The corresponding perforating roller 70 is formed with cylindrical recesses 76 corresponding to the cylindrical protrusions 74. The cylindrical recesses 76 are likewise arranged in two rows. One or both of the two perforating rollers 70,72 are heated. By the heating, the holes 14 are molded into main film 10. The holes are thus not generated by punching so that no film waste is generated.

The perforating roller 70 can also be omitted. In this case, the perforating is performed solely by means of the perforating roller 72 with the protrusions 74. Because of the tension in the film, the film only slightly deviates from the perforating roller 72, thus adhering sufficiently close to the perforating roller 72 or the protrusions 74 for having the perforations formed therein.

Apart from circular holes 14, any desired other shape can be selected for the holes. Particularly advantageous is an oval or elliptic hole shape having its longer semiaxis extending transversely to the longitudinal direction of the film sheet so that the shorter semiaxis is oriented in parallel to the tension direction prevailing in the stretch films.

After forming the holes 14 in the main film 10, the film sheet is deflected a plurality of times via guide rollers 78. In this manner, there is provided a cooling path in which the film sheet will be cooled again sufficiently to keep it from becoming bonded to itself when being wound up afterwards. After the cooling path, the film sheet wound up to form a roll 80. Roll 80 moves vertically to the transport direction of the film sheet in the direction of the arrow 82, i.e. in a horizontal direction. This will safeguard that the reinforcement strips 12 when being wound onto roll 80 will not be arranged completely above each other. By the reciprocating movement of the wind-up roll 80, the roll has a substantially identical thickness throughout its width. Further, to guarantee a uniform winding onto roll 80, a press-on roller 84 is provided.

The invention claimed is:

1. A method of producing a stretch film for packing items, comprising:
    supplying film strips from a first prestretched film,
    folding the film strips at least once in a transverse direction thereof to obtain reinforcement strips,
    supplying a prestretched main film, and
    attaching the reinforcement strips to the main film in such a manner that the reinforcement strips extend in parallel to each other in a longitudinal direction of the main film, wherein the main film and the reinforcement strips are adhered to each other while they have different temperatures; and
    wherein, after the reinforcement strips are adhered to the main film, a plurality of mutually staggered rows of oval or elliptic holes are configured between two reinforcement strips to extend in the longitudinal direction of the main film so that the shorter semiaxis is oriented in parallel to the tension direction prevailing in the stretched film.

2. The method according to claim 1, wherein the film strips are generated by cutting the first prestretched film.

3. The method according to claim 1 wherein at least one of the main film and the first prestretched film includes additives for intensifying a connection between the main film and the first prestretched film.

4. The method according to claim 1 wherein the main film and the reinforcement strips are attached by application of heat.

5. The method according to claim 1 wherein the film strips are folded two to four times.

6. The method according to claim 1 wherein at least three reinforcement strips are provided in parallel to each other.

7. A stretch film, comprising:
    a prestretched main film;
    reinforcement strips made from a prestretched film and extending in a longitudinal direction of the prestretched main film; and
    a plurality of holes perforated in the main film only in regions between the reinforcement strips and having reinforced edges;
    wherein the reinforcement strips are film strips made from the prestretched film which is folded in the transverse direction.

8. The stretch film according to claim 7, wherein the holes are configured in mutually staggered rows.

9. The stretch film according to claim 7, wherein the reinforcement strips comprise the film strips made from the prestretched film which is folded two to four times.

10. The stretch film according to claim 7, wherein said reinforcement strips comprise at least three mutually parallel reinforcement strips.

11. A method of packing food items with the stretch film of claim 7.

12. A method of wrapping a pallet load with the stretch film of claim 7.

13. The stretch film according to claim 7, wherein the holes are oval or elliptic holes each having a longer semiaxis oriented transversely to the longitudinal direction of the main film so that a shorter semiaxis of said hole is oriented in parallel to a tension direction prevailing in the stretch film.

14. A method of producing a stretch film for packing items, said method comprising:
    supplying film strips from a first prestretched film,
    folding the film strips at least once in a transverse direction thereof to obtain reinforcement strips,
    supplying a prestretched main film other than the first prestretched film and the reinforcement strips,
    adhering the reinforcement strips to the main film in such a manner that the reinforcement strips extend in parallel to each other in a longitudinal direction of the main film, and
    perforating holes in the main film only in regions between the reinforcement strips.

15. The method according to claim 14, wherein:
    said perforating holes in the main film only in regions between the reinforcement strips is performed after the reinforcement strips are adhered to the main film.

16. The method according to claim 15, wherein said perforating forms the holes in multiple rows elongated in the longitudinal direction of the main film, and the holes in adjacent said rows are mutually staggered.

17. The method according to claim 16, wherein said holes are oval or elliptic holes each having a longer semiaxis oriented transversely to the longitudinal direction of the main film.

18. The method according to claim 17, wherein the main film and the reinforcement strips are adhered to each other while they have different temperatures.

19. The method according to claim 14, wherein said adhering comprises adhesively bonding or heat bonding.

20. The method according to claim 14, wherein the film strips are generated by cutting the first prestretched film which is identical to the main film.

21. The method according to claim 14, wherein the film strips are folded two to four times.

22. The method according to claim 14, wherein at least three said reinforcement strips are adhered, in parallel to each other, to the main film.

* * * * *